United States Patent
Son et al.

(10) Patent No.: US 7,771,676 B2
(45) Date of Patent: Aug. 10, 2010

(54) PREFERENTIAL OXIDATION REACTOR INTEGRATED WITH HEAT EXCHANGER AND OPERATING METHOD THEREOF

(75) Inventors: In-hyuk Son, Suwon-si (KR); Hyun Kim, Suwon-si (KR); Chang-bong Lee, Suwon-si (KR); Min-jung Oh, Suwon-si (KR); Man-seok Han, Suwon-si (KR); Yong-kul Lee, Suwon-si (KR); Jin-goo Ahn, Suwon-si (KR); Chan-ho Lee, Suwon-si (KR); Ju-yong Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 249 days.

(21) Appl. No.: 12/007,362

(22) Filed: Jan. 9, 2008

(65) Prior Publication Data

US 2008/0166284 A1 Jul. 10, 2008

(30) Foreign Application Priority Data

Jan. 9, 2007 (KR) ...................... 10-2007-0002532

(51) Int. Cl.
*B01J 8/02* (2006.01)
*C01B 3/26* (2006.01)

(52) U.S. Cl. ................... 422/211; 422/114; 422/190; 423/651

(58) Field of Classification Search ............. None
See application file for complete search history.

(56) References Cited

U.S. PATENT DOCUMENTS

| | | | | |
|---|---|---|---|---|
| 1,807,164 A | * | 5/1931 | Modine | 165/DIG. 99 |
| 3,148,511 A | * | 9/1964 | Gable | 62/272 |
| 7,189,373 B2 | * | 3/2007 | Taniguchi et al. | 422/129 |
| 7,192,458 B1 | * | 3/2007 | Harness et al. | 429/17 |
| 7,195,742 B2 | * | 3/2007 | Liu et al. | 423/247 |
| 7,527,884 B2 | * | 5/2009 | Kamijo | 423/655 |

(Continued)

FOREIGN PATENT DOCUMENTS

JP 2000-053402 2/2000

(Continued)

OTHER PUBLICATIONS

*Notice of Allowance* from the Korean Intellectual Property Office issued in Applicant's corresponding Korean Patent Application No. 2007-0002532 dated Nov. 15, 2007.

*Primary Examiner*—Walter D Griffin
*Assistant Examiner*—Timothy Cleveland
(74) *Attorney, Agent, or Firm*—Robert E. Bushnell, Esq.

(57) ABSTRACT

A PROX reactor integrated with a heat exchanger and an operating method thereof capable of effectively controlling temperature of a preferential oxidation reactor so as to obtain optimal activation and yield. The PROX reactor integrated with a heat exchanger of the present invention includes a pipe having an inlet and an outlet, a heat exchanger cooling gas passing through the pipe, a catalyst part positioned at the rear end of the heat exchanger, upon considering the flow of gas, and shifting carbon monoxide contained in the gas into other substances; and a temperature sensor measuring the temperature of the gas coming out through the catalyst part.

20 Claims, 7 Drawing Sheets

U.S. PATENT DOCUMENTS

| | | | |
|---|---|---|---|
| 2003/0170160 A1* | 9/2003 | Morita et al. | 423/247 |
| 2003/0211025 A1* | 11/2003 | Blommel et al. | 423/247 |

FOREIGN PATENT DOCUMENTS

| | | |
|---|---|---|
| KR | 10-0156088 | 7/1998 |
| KR | 10-2000-0033125 | 6/2000 |
| KR | 10-2006-0016986 | 2/2006 |
| KR | 10-2006-0085755 | 7/2006 |

* cited by examiner

PREFERENTIAL OXIDATION REACTOR INTEGRATED WITH HEAT EXCHANGER AND OPERATING METHOD THEREOF

CROSS-REFERENCE TO RELATED APPLICATION AND CLAIM OF PRIORITY

This application claims the benefit of Korean Patent Application No. 10-2007-0002532, filed on Jan. 9, 2007, in the Korean Intellectual Property Office, the entire content of which is incorporated herein by reference.

BACKGROUND

1. Field of the Invention

The present invention relates to a fuel processor, and more particular to a preferential oxidation reactor integrated with a heat exchanger capable of effectively removing carbon monoxide (CO) contained in reformed gas.

2. Discussion of Related Art

A fuel processor is referred to as a process and a system that produces hydrogen from fuel. The fuel processor is constituted by an apparatus that reforms fuel to produce reformed gas and an apparatus that removes sulfur and/or carbon monoxide contained in reformed gas. The hydrogen produced by the fuel processor has been used in a power generation system such as a fuel cell, etc.

Since the fuel cell is a pollution-free power supply apparatus, it has been spotlighted as one of next-generation clean energy power generation systems. The power generation system using the fuel cell can be utilized as a self generator of a large building, a power supply of an electric vehicle, a portable power supply, and the like, and is advantageous of being capable of using various fuels such as natural gas, methanol, petroleum, liquefied petroleum gas (LPG), dimethyl ether (DME), coal, waste gas, and the like. The fuel cell is essentially operated by the same principle, and can be sorted into a phosphoric acid fuel cell, an alkaline fuel cell, a polymer electrolyte membrane fuel cell, a direct methanol fuel cell, and a solid oxide fuel cell depending on its internal electrolyte.

Among others, since the polymer electrolyte membrane fuel cell (PEMFC) uses a polymer membrane as electrolyte, it has no risk of corrosion or evaporation and can obtain a high current density per unit area. Moreover, since the polymer electrolyte membrane fuel cell is very high in output characteristics and low in operating temperature over other kinds of fuel cells, it has actively been developed as a portable power supply for supplying power to a vehicle, a distributed power supply for supplying power to a house or a public building, etc., and a small power supply for supplying power to a portable electronic equipment, etc.

The polymer electrolyte membrane fuel cell produces electric energy by an electro-chemical reaction of hydrogen supplied to its anode side and oxygen supplied to its cathode side. As hydrogen, there has been used pure hydrogen or a hydrogen storage alloy which generates hydrogen gas, or hydrogen in reformed gas obtained from fossil fuels. As oxygen, there has been used pure oxygen or oxygen contained in air. However, in case of using the pure hydrogen or the hydrogen storage alloy, it is disadvantageous of involving a high cost due to the difficulties of production, storage, and transportation. Therefore, as hydrogen fuel for a fuel cell, hydrogen-rich reformed gas obtainable from a fuel reformer has usually bee used.

As the fuel reformer, there has been a steam reforming (SR) reactor that produces hydrogen-rich reformed gas by the reaction of fuel and steam, a partial oxidation (POX) reactor that produces hydrogen-rich reformed gas by oxidizing fuel, and a reactor that combines the steam reforming reaction and the partial oxidation reaction. And, as a carbon monoxide reducer which removes carbon monoxide contained in the reformed gas, there has been a water gas shift reactor or a preferential oxidation (PROX) reactor.

In general, the PROX reactor mixes air with the reformed gas and then removes carbon monoxide from the reformed gas by using a catalyst having high carbon monoxide selectivity. In order to make the selectivity and rate of the oxidation reaction better, the temperature of the reactor is required to be maintained in the temperature range of about 130 to 250° C. However, since the preferential oxidation reaction is an exothermic reaction accompanied by a large heat generation, it is very difficult to maintain the temperature range. Further, since the PROX reactor may easily generate the temperature difference in the flow direction of the reformed gas, it is very difficult to maintain the uniform reaction temperature in the entire reactor. Therefore, it is difficult to control the PROX reactor in order to generate the uniform oxidation reaction in the PROX reactor. As such, since in the PROX reactor sensitive to the temperature, its performance is considerably varied according to the temperature range, it is necessary to suppress the temperature variation of the reactor and maintain the temperature in the constant range.

Also, when a high temperature of hot spots occur, the activation of catalysts located at the hot spots is rapidly reduced and the hot spots are gradually diffused so that the phenomenon considerably reducing the activation of the catalysts in the reactor occurs. Therefore, it has been demanded a scheme capable of reducing a problem of that the reaction gas is drifted in the catalyst layer, so as not to generate the hot spots.

SUMMARY OF THE INVENTION

It is an object of the present invention to provide a PROX reactor integrated with a heat exchanger and an operating method thereof capable of effectively control reaction temperature so as to obtain optimal activation and yield.

In order to accomplish the above object, there is provided a PROX reactor integrated with a heat exchanger including: a pipe having an inlet and an outlet; a heat exchanger integrated with the pipe, the heat exchanger cooling gas that passes through the pipe; a catalyst part positioned in the pipe at the rear end of the heat exchanger, the catalyst part catalyzing a reaction of the gas; and a temperature sensor measuring the temperature of the gas coming out through the catalyst part.

Preferably, the pipe includes a first pipe having the inlet and a second pipe having the outlet, the heat exchanger is positioned between the first pipe and the second pipe, the catalyst part is positioned in the second pipe, and the temperature sensor comprises a first temperature sensor coupled with the second pipe.

The heat exchanger includes a plurality of sub-pipes connecting the first pipe and the second pipe, a heat transfer plate positioned between the plurality of sub-pipes and having a thin and crimped shape, and a fan blowing air to the heat transfer plate.

The PROX reactor integrated with the heat exchanger is coupled with the second pipe and can further include a water discharging part for discharging the water generated in the catalyst part.

According to an embodiment of the present invention, the pipe may includes a first pipe having the inlet and a second pipe for receiving the gas from a first heat exchanger, a third pipe for receiving the gas from the second pipe, and a fourth pipe for receiving the gas from a second heat exchanger and discharging the gas through the outlet, and the heat exchanger includes the first heat exchanger positioned between the first pipe and the second pipe and the second heat exchanger positioned between the third pipe and the fourth pipe.

According to an embodiment of the present invention, the first heat exchanger comprises a plurality of sub-pipes connecting the first pipe and the second pipe, a heat transfer plate positioned between the plurality of sub-pipes and having a thin and crimped shape, and a fan blowing air to the heat transfer plate; and the second heat exchanger comprises-a plurality of sub-pipes connecting the third pipe and the fourth pipe, a heat transfer plate-positioned between the plurality of sub-pipes of the second heat exchanger and having a thin and crimped shape, and a fan blowing air to the heat transfer plate of the second heat exchanger.

According to an embodiment of the present invention, the catalyst part comprises a first catalyst part positioned in the pipe between the first heat exchanger and the second heat exchanger and a second catalyst part positioned in the fourth pipe.

According to an embodiment of the present invention, the temperature sensor comprises a first temperature sensor measuring the temperature of the gas coming out through the first catalyst part and a second temperature sensor measuring the temperature of the gas coming out through second catalyst part.

According to an embodiment of the present invention, the preferential oxidation reactor further includes a reaction controller controlling the operation of the first and second heat exchangers by blocking the gas flowing into the first pipe when the temperature detected in said another temperature sensor exceeds a predetermined critical temperature, first-operating (i) the first heat exchanger at a first cooling rate and the second heat exchanger at a first cooling rate when the temperature detected in the first temperature sensor is over a first reference temperature and the temperature detected in the second temperature sensor is over a second reference temperature, (ii) the first heat exchanger at the first cooling rate when the temperature detected in the first temperature sensor is over the first reference temperature and the temperature detected in the second temperature sensor is not over the second reference temperature, or (iii) the second heat exchanger at the first cooling rate when the temperature detected in the first temperature sensor is not over the first reference temperature and the temperature detected in the second temperature sensor is over the second reference temperature, second-operating (a) the first heat exchanger at a second cooling rate which is higher than the first cooling rate of the first heat exchanger and the second heat exchanger at a second cooling rate which is higher than the first cooling rate of the first heat exchanger after the first-operating (i) when the temperature detected in the first temperature sensor is over a third reference temperature and the temperature detected in the second temperature sensor is over a fourth reference temperature, (b) the first heat exchanger at the second cooling rate after the first-operating (ii) when the temperature detected in the first temperature sensor is over the third reference temperature, or (c) the second heat exchanger at the second cooling rate after the first-operating (iii) when the temperature detected in the second temperature sensor is over the second reference temperature.

According to an embodiment of the present invention, the catalyst part includes noble metal based catalysts selected from the group consisting of platinum, ruthenium, a rhodium, copper and chromium, and cocatalysts of at least one selected from the group consisting of cerium, iron, and manganese.

According to an embodiment of the present invention, the catalyst part may include a supporting body in a honeycomb shape and a catalyst immobilized on the supporting body.

According to an embodiment of the present invention, the catalyst part may include a catalyst in a bead shape and a reticular formation arranged at the ends of the catalyst to prevent the catalyst from being scattered.

In another aspect of the present invention, there is provided an operating method of a PROX reactor integrated with a heat exchanger including a heat exchanger coupled with a pipe having an inlet and an outlet and cooling gas passing through the pipe, a catalyst part positioned at the rear end of the heat exchanger and reducing the concentration of carbon monoxide contained in the gas, and a temperature sensor measuring the temperature of the gas coming out through the catalyst part, the operating method including the steps of: comparing the temperature detected in the temperature sensor with the range of a reference temperature; if the detected temperature is within the range of the reference temperature, operating the heat exchanger at a low speed; and if the detected temperature exceeds the range of the reference temperature, operating the heat exchanger at a high speed.

Preferably, the PROX reactor integrated with the heat exchanger further includes another heat exchanger that cools the gas passing through the catalyst part and the operating method further includes operating another heat exchanger when the detected temperature exceeds the range of the reference temperature.

The PROX reactor integrated with the heat exchanger may further include another temperature sensor positioned at the front end of the heat exchanger and the operating method may further include blocking the gas from flowing in the pipe when the temperature detected in another temperature sensor exceeds critical temperature.

In another aspect of the present invention, there is provided an operating method of a PROX reactor integrated with a heat exchanger including a first heat exchanger coupled with a pipe having an inlet and an outlet and cooling gas passing through a pipe, a first catalyst part positioned at the rear end of the first heat exchanger and reducing the concentration of carbon monoxide contained in the gas, a first temperature sensor measuring the temperature of the gas coming out through the first catalyst part, a second heat exchanger cooling the gas coming out through the first catalyst part, a second catalyst part positioned at the rear end of the second heat exchanger and further reducing the concentration of carbon monoxide in the gas passing through the first catalyst part, and a second temperature sensor measuring the temperature of the gas coming out through the second catalyst part, the operating method including the steps of: comparing a first temperature detected in the first temperature sensor with the range of a first reference temperature and a second temperature detected in the second temperature sensor with the range of a second reference temperature; if the first temperature exceeds the range of the first reference temperature, operating the first heat exchanger; and if the second temperature exceeds the range of the second reference temperature, operating the second heat exchanger.

Preferably, the operating the first heat exchanger includes operating the first heat exchanger at a higher second level in cooling rate than a first level if the first temperature again detected after operating the first heat exchanger at the first level for a predetermined time still exceeds the range of the first reference temperature.

Also, the operating the second heat exchanger includes operating the second heat exchanger at a higher second level in cooling rate than a first level if the second temperature again detected after operating the second heat exchanger at the first level for a predetermined time still exceeds the range of the second reference temperature.

The PROX reactor integrated with the heat exchanger further includes a third temperature sensor positioned at the front end of the first heat exchanger and the operating method thereof may further include blocking the gas from flowing in the pipe when the temperature detected in the third temperature sensor exceeds critical temperature.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Figure 1A:
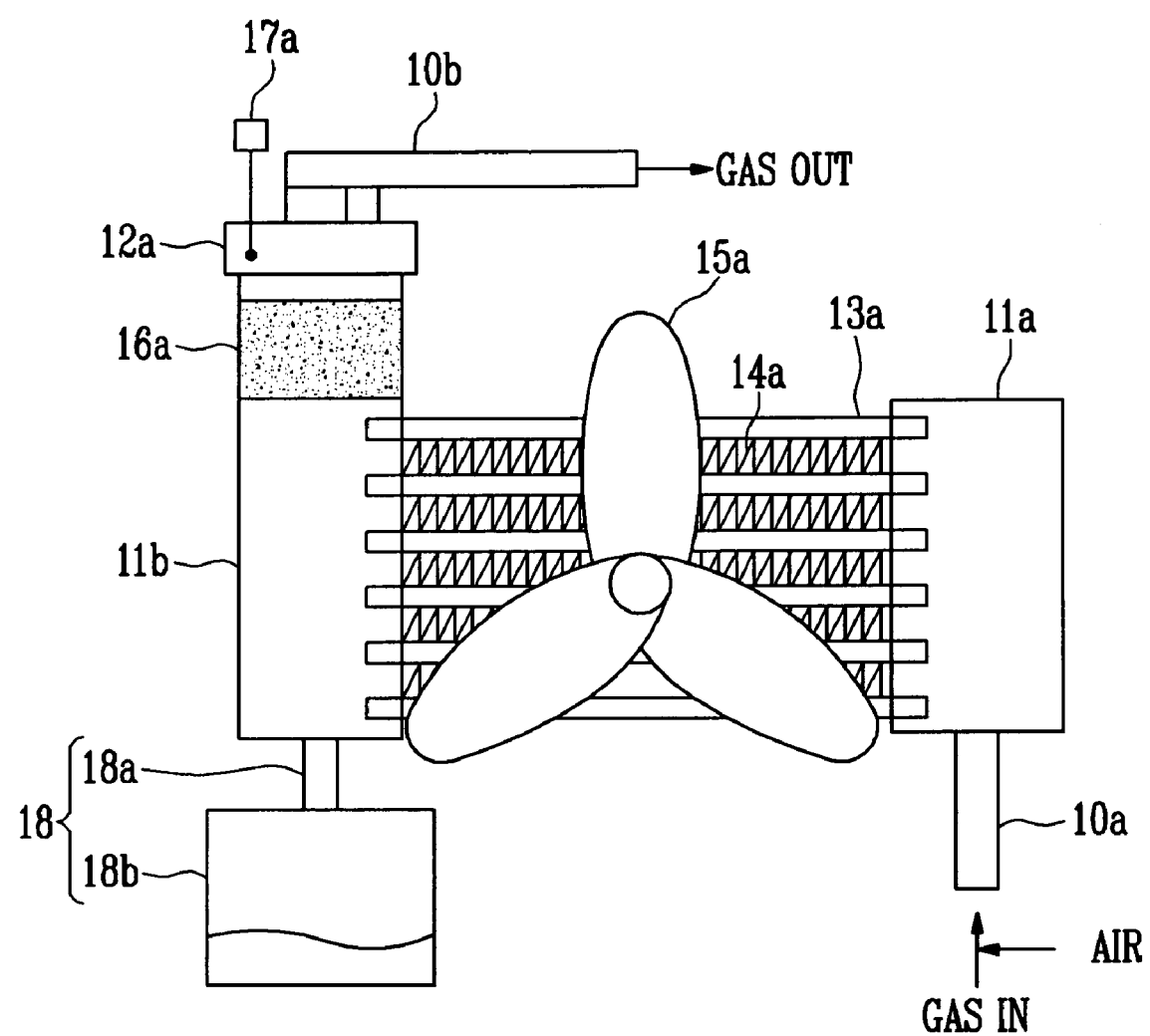
FIGS. 1A and 1B are schematic views of a PROX reactor integrated with a heat exchanger according to a first embodiment and a second embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, elements that are not essential to the complete understanding of the invention are omitted for clarity. Also, like reference numerals refer to like elements throughout.

Figure 1B:
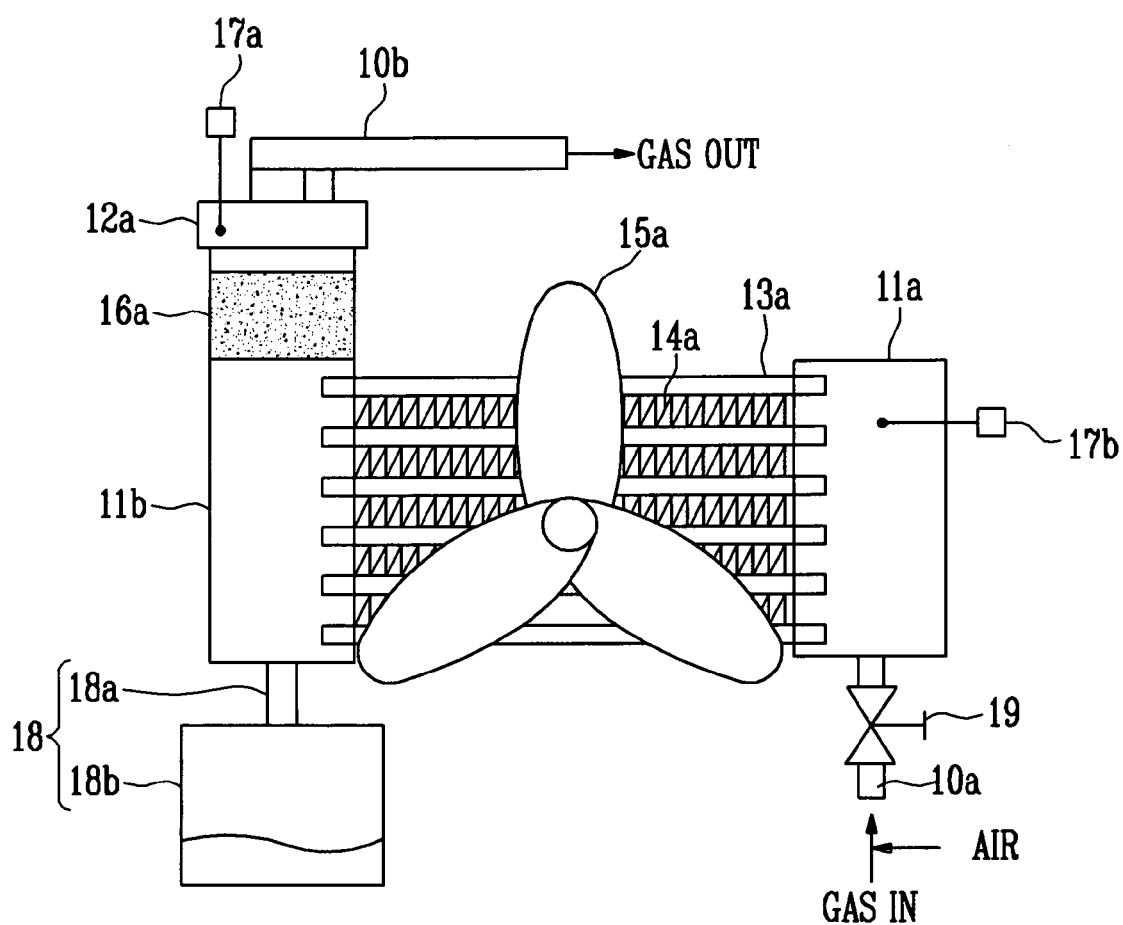

FIGS. 1A and 1B are schematic views of a PROX reactor integrated with a heat exchanger according to a first embodiment and a second embodiment of the present invention.

Referring to FIG. 1A, the PROX reactor of the present invention includes a first pipe 11a, a second pipe 11b, sub-pipes 13a, heat transfer plates 14a, a fan 15a, a catalyst part 16a, a temperature sensor 17a, and a water discharging part 18.

The PROX reactor according to the embodiment is implemented to uniformly maintain the temperature of the reactor when removing carbon monoxide in reformed gas generated from a fuel reformer by using a heat exchanger commonly used in a fuel cell system.

More specifically, the first pipe 11a is formed of a hollow pipe in a cylindrical shape or a polygonal shape and is coupled with an inlet 10a for flowing in the reformed gas. The inlet 10a is disposed on the lower side of the first pipe 11a, upon considering gravity direction as a reference. Gas and air, with high temperature, incoming from the fuel reformer to the pipe 11a through the inlet 10a move from the lower side of the first pipe 11a to the upper side thereof.

The second pipe 11b is installed to be expanded from the first pipe 11a through the sub-pipes 13a. The second pipe 11b may be formed of a hollow pipe in a cylindrical shape or a polygonal shape. The inside of the second pipe 11b is provided with a catalyst part 16a having catalysts for catalyzing the reaction of reducing carbon monoxide contained in the reformed gas. And, the second pipe 11b is coupled with an outlet 10b for discharging the reformed gas with the reduced carbon monoxide. The outlet 10b is disposed on the upper side of the second pipe 11b to be suitable to the flow of the reformed gas in high energy state, upon considering gravity direction as a reference, and is fixedly coupled with the second pipe 11b by a coupling 12a.

The sub-pipes 13a distribute the flow of the reformed gas moving from the first pipe 111a to the second pipe 11b to effectively recover the thermal energy of the reformed gas. To this end, the sub-pipes 13a are formed of a hollow pipe in a cylindrical shape or a polygonal shape, a plurality of the sub-pipes are disposed between the first pipe 11a and the second pipe 11b, and a cross-sectional area of each sub-pipe 13a, that is, a cross-sectional area of a channel through which the reformed gas passes is smaller than those of the hollow portions of the first pipe 11a and/or the second pipe 11b. The plurality of sub-pipes 13a are supported and connected to each other by the heat transfer plates 14a.

The heat transfer plates 14a is formed of an excellent thermal conductive member such as a metal member and has a thin band shape. Preferably, the heat transfer plate 14a is disposed in a wave form between at least two neighboring sub-pipes 13a of the sub-pipes 13a. The heat transfer plates 14a deprives the thermal energy of the reformed gas passing through the sub-pipes 13a by a natural air flow or an intentional air flow and then discharges it into the air.

The fan 15a forms the intentional or forced air flow to the heat transfer plates 14a. The fan 15a is one example of a device capable of forming the forced air flow. The fan 15a can be turned on and off and operated at a first speed (hereinafter referred to as "low speed") or a second speed which is higher than the first speed (hereinafter referred to as "high speed") in response to a controlling apparatus, for example, a controller of a fuel cell system The heat exchanger is configured of the sub-pipes 13a, the heat transfer plates 14a, and the fan 15a as described above. Such a heat exchanger may be, but is not limited to, an existing heat exchanger used for the heat management of the entire system or some components thereof. In other words, it is one of the features of the present invention to provide a PROX reactor integrated with a heat exchanger capable of easily performing the temperature control by changing the structure of the heat exchanger used in the existing fuel cell system. Of course, it is clear that the present invention can be applied to a water cooling type heat exchanger in addition to an air cooling type heat exchanger as described above.

The catalyst part 16a includes catalysts for a preferential oxidation reaction that performs preferential exothermic reaction of carbon monoxide in the reformed gas and oxygen in the air and shifts it into other substances. Preferably, the catalyst part 16a reduces the concentration of carbon monoxide in the reformed gas to 10 ppm or less, for example. As the catalysts of the catalyst part 16a there can be used ruthenium (Ru), rhodium (Rh), platinum (Pt), titania (TiO$_2$), Pt/Al$_2$O$_3$, ZrO$_2$, Au/Fe$_2$O$_3$, etc.

The preferential oxidation reaction of the catalyst part 16a as described above can simply be represented in reaction equation as follows.

$$CO + 1/2 O_2 \rightarrow CO_2$$

$$H_2 + 1/2 O_2 \leftarrow \rightarrow H_2O \qquad \text{[Reaction Equation 1]}$$

The temperature sensor 17a is coupled with the second pipe 11b, the coupling 12a or the outlet 10b and measures the temperature of the reformed gas coming out through the catalyst part 16a. As the temperature sensor, there can be used a resistance temperature detector (RTD), a thermocouple, and a thermistor.

The water discharging part 18 is a part which discharges water that is a by-product generated from the preferential oxidation reaction of the catalyst part 16a. The water discharging part 18 includes an outlet 18a coupled with the lower side of the second pipe 11b, seen from gravity direction, and a condenser 18b coupled with the outlet 18a.

In the PROX reactor integrated with the heat exchanger, when reducing carbon monoxide in the reformed gas flowed in by the catalyst reaction, the catalysts in the reactor can be damaged if the temperature of the reformed gas flowed in the reactor is excessively higher than a specific reference temperature and the catalysts in the fuel cell stack can be damaged if the temperature of the reformed gas supplied from the reactor to the fuel cell stack is excessively higher than a specific reference temperature. Therefore, the embodiment of the present invention may further include another temperature sensor 17b measuring the temperature of the reformed gas flowed in a valve 19 installed at the front end of the reactor and the first pipe 11a, as shown in FIG. 1B. The temperature sensor 17b can be installed to measure the temperature of the reformed gas flowed in the first pipe 11a or can be installed at the front end of the valve 19 to measure the temperature of the reformed gas to be flowed in the first pipe 11a. In the PROX reactor of the present invention as described above, when the temperature of the reformed gas flowed in the first pipe 11a exceeds a specific reference temperature, for example, 300° C., the inflow of the reformed gas to the reactor is blocked by the operation of the valve 19. The blocked reformed gas can be used as the fuel of the combustor supplying heat to the fuel reformer in order to effectively use the fuel.

Figure 2:
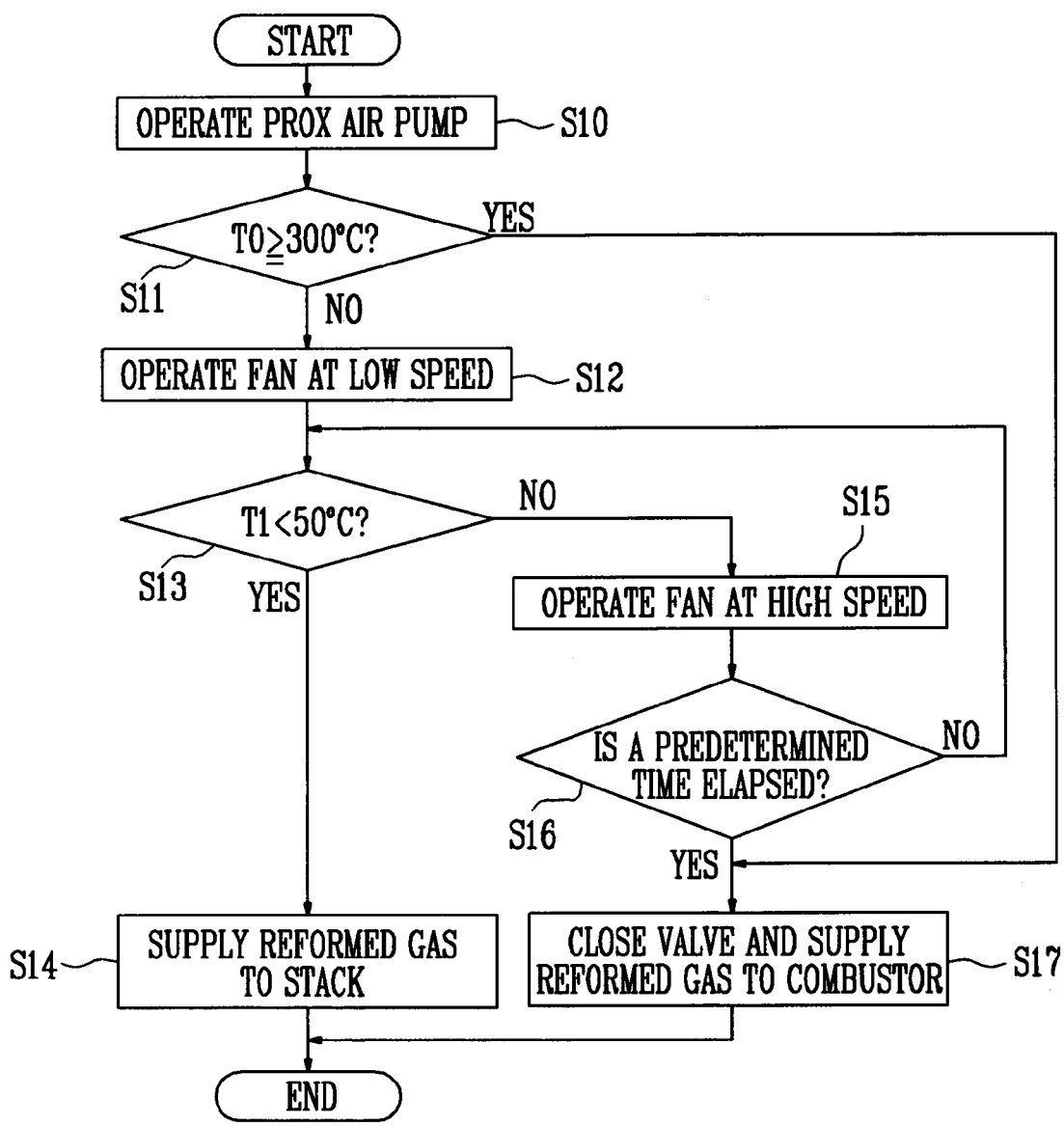
FIG. 2 is a flow chart for an operating method of a PROX reactor integrated with a heat exchanger according a second embodiment of the present invention.

FIG. 2 is a flow chart for an operating method of a PROX reactor integrated with a heat exchanger according to the second embodiment of the present invention.

Referring to FIGS. 1b and 2, in order to operate the PROX reactor integrated with the heat exchanger of the present invention, it first operates an air pump for the PROX reactor (S10). Next, it detects the temperature of gas flowed in and compares the temperature TO detected in the temperature sensor 17b with a reference temperature, for example, 300° C. (S11). The step S11 is to determine whether it continuously supplies the reformed gas to the PROX reactor or blocks the supply of the reformed gas (or supplies the reformed gas to the combustor) according to the temperature of the reformed gas TO detected in the temperature sensor 17b, when the reformed gas and air are flowed in the reactor by the operation of the air pump for the PROX reactor.

In the step S11, if the temperature of the reformed gas detected in the temperature sensor 17b is below 300° C., it operates the fan 15a of the heat exchanger at a low speed (level 1) being basic state while continuously supplying the reformed gas to the PROX reactor (S12).

Next, if the temperature of the reformed gas cooled by the heat exchanger and coming out through the catalyst part 16a is detected by the temperature sensor 17a, it compares the detected temperature T1 with a first reference temperature, for example, 50° C. (S13). The step S13 is for allowing the temperature of the reformed gas to be supplied to the fuel cell stack to be in the range of desired temperature.

In the step S13, if the detected temperature T1 is below 50° C., it supplies the reformed gas to the fuel cell stack while maintaining the present state (S14).

In the step S13, if the detected temperature exceeds 50° C., it operates the fan 15a of the heat exchanger at a high speed (level 2) (S15). When the fan 15a is operated at the high speed, the steps S13 and S15 can repeatedly performed for a predetermined time. And, even after the predetermined time elapses S16, if the detected temperature T1 still is not below 50° C., it closes the valve 19 and supplies the reformed gas to the combustor, which is a heat source for the fuel reformer (S17).

In the step S11, if the temperature of the reformed gas TO is equal to or exceeds 300° C., it blocks the inflow of the reformed gas to the PROX reactor and supplies the reformed gas to the combustor (S17).

Figure 3:
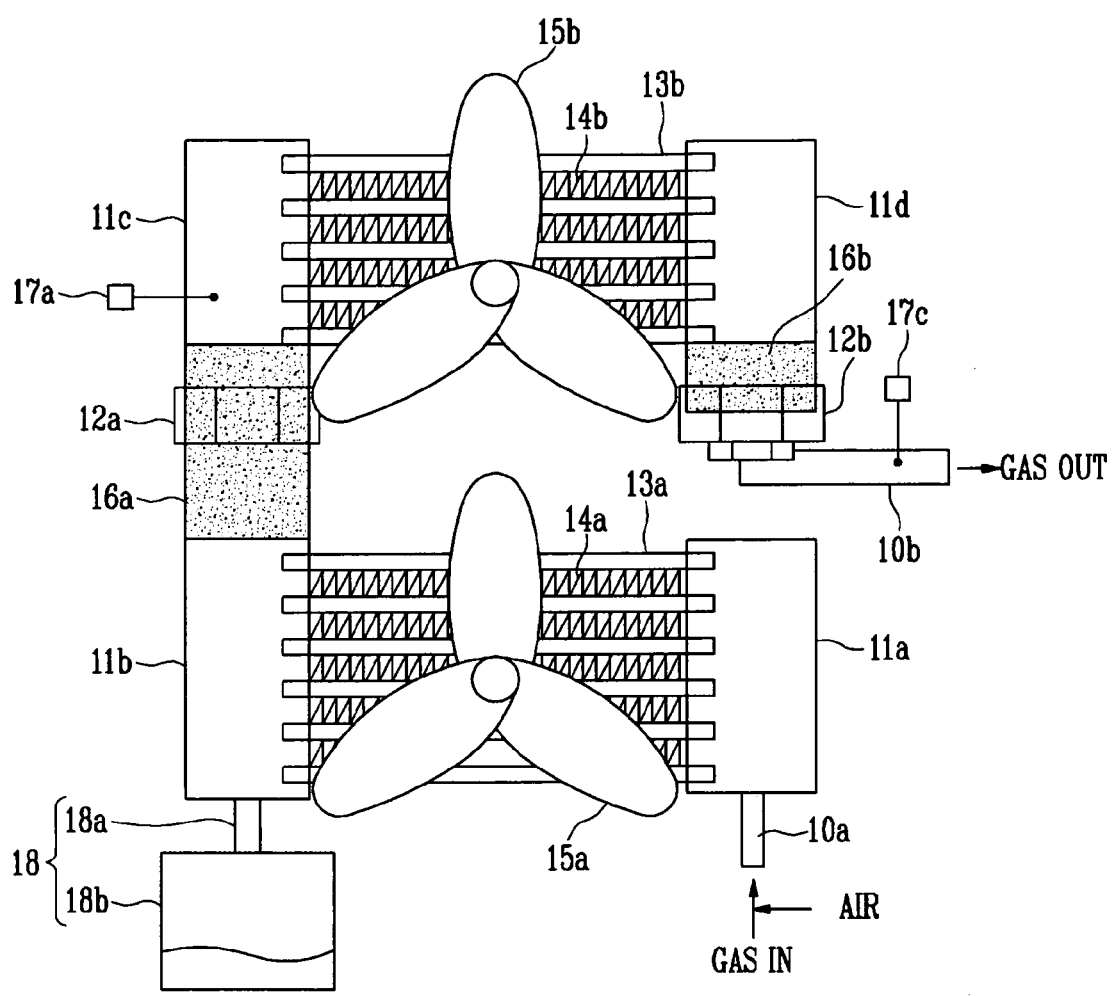
FIG. 3 is a schematic view of a PROX reactor integrated with a heat exchanger according to a third embodiment of the present invention.

FIG. 3 is a schematic view of a PROX reactor integrated with a heat exchanger according to a third embodiment of the present invention.

Referring to FIG. 3, the PROX reactor integrated with the heat exchanger of the present invention is integrally coupled with two heat exchangers and can be configured to more effectively control the reaction temperature of the PROX reactor by controlling the operation of the two heat exchangers. The PROX reactor integrated with the heat exchanger of an embodiment of the present invention includes a pipe having an inlet 10a and an outlet 10b, a first heat exchanger and a second heat exchanger coupled with the pipe, two catalyst parts 16a and 16b each disposed at the rear end of the first heat exchanger and the rear end of the second heat exchanger, two temperature sensors 17a and 17c each disposed at the rear ends of the two catalyst parts 16a and 16b, and a water discharging part 18 discharging water coming out of one catalyst 16a.

In the PROX reactor integrated with the heat exchanger according to the present embodiment, the pipe takes a structure bent in clockwise direction or counterclockwise direction in order to effectively control the entire temperature gradient of the reactor. It is preferable that the two heat exchangers are disposed in the bent pipe in a two-layer structure, in view of the effective arrangement of the reactor.

The pipe according to the second embodiment of the present invention includes a first pipe 11a coupled with the inlet 10a, a second pipe 11b connected to the first pipe 11a through a plurality of sub-pipes 13a of the first heat exchanger, a third pipe 11c coupled with the upper side of the second pipe 11b through a first coupling 12a, and a fourth pipe 11d connected to the third pipe 11c through a plurality of sub-pipes 13b of the second heat exchanger. The fourth pipe 11d is coupled with the outlet 10b through a second coupling 12b.

The first heat exchanger as described above includes a plurality of sub-pipes 13a, heat transfer plates 14a which supports the sub-pipes 13a and are disposed in a wave form between the plurality of sub-pipes 13a, and a fan 15a blowing air to the heat transfer plates 14a. The second heat exchanger includes a plurality of sub-pipes 13b, heat transfer plates 14b supporting the sub-pipes 13b and disposed in a wave form between the plurality of sub-pipes 13b, and a fan 15a blowing air to the heat transfer plates 14b.

The first catalyst part 16a of the two catalyst parts as described above is disposed between the second pipe 11b and the third pipe 11c, and the second catalyst part 16b is disposed between the fourth pipe 11d and the outlet 10b.

The first temperature sensor 17a of the two temperature sensors as described above is disposed at the rear end of the first catalyst part 16a, and the second temperature sensor 17c is disposed at the rear end of the second catalyst part 16b or near the outlet 10b. The first temperature sensor 17a measures the temperature of the reformed gas coming out through the first catalyst part 16a, and the second temperature sensor 17b measures the temperature of the reformed gas coming out through the second catalyst part 16b.

The water discharging part 18 discharges water that is by-products generated by the preferential oxidation reaction of the first catalyst part 16a. To this end, the water discharging part 18 includes an outlet 18a coupled with the lower side of the second pipe 11b and a condenser 18b condensing steam coming out through the outlet 18a and accepting water. The water that is by-products generated by the preferential oxidation reaction of the second catalyst part 16b can be discharged together with the reformed gas through the outlet 10b.

Figure 4:
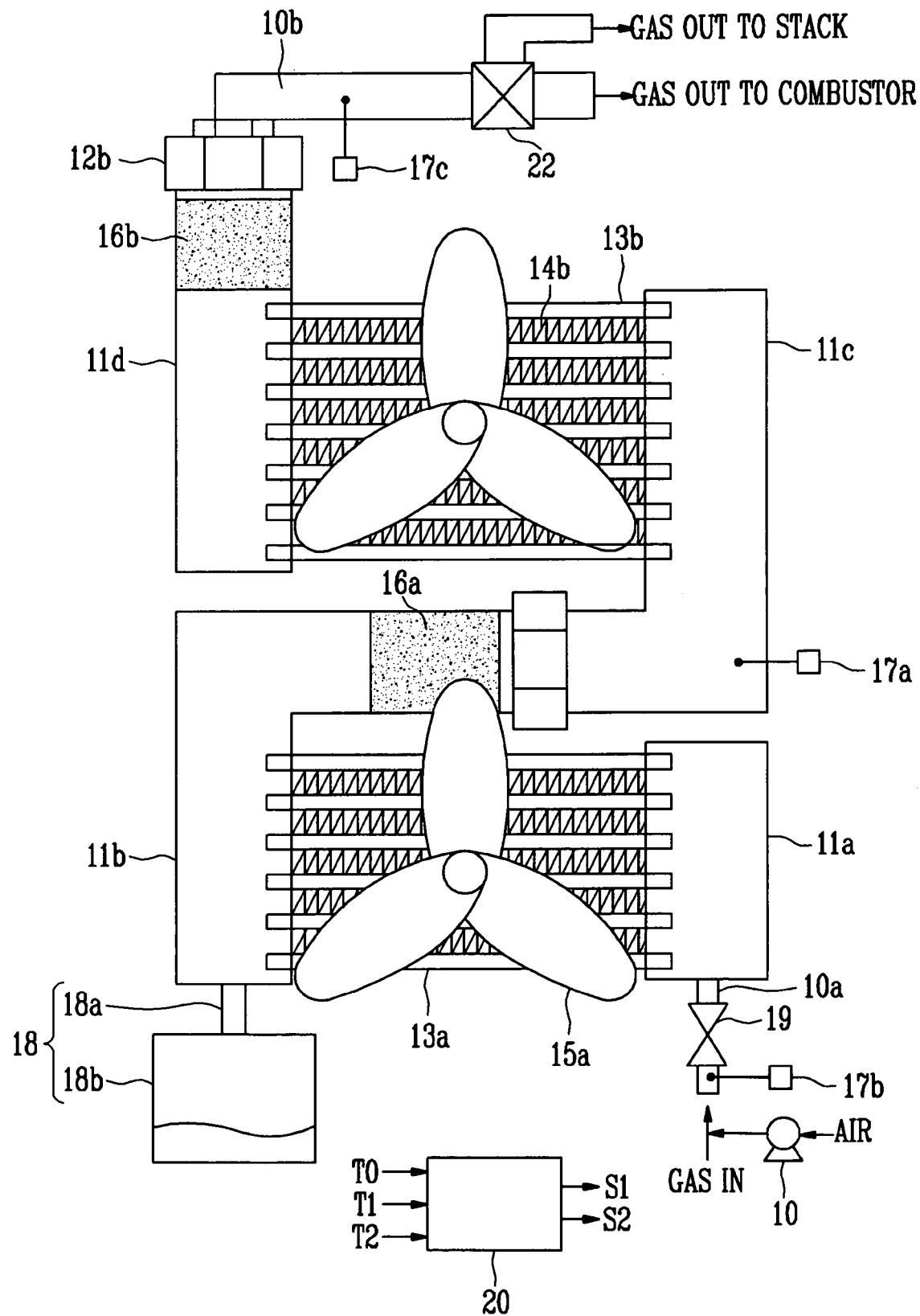
FIG. 4 is a schematic view for a PROX reactor integrated with the heat exchanger according to a fourth embodiment which is a modification example of the third embodiment shown in FIG. 3.

According to a third embodiment of the present invention as shown in FIG. 4, The PROX reactor integrated with the heat exchanger of the present invention may include a first to fourth pipes 11a, 11b, 11c, and 11d which may be bent in a S-letter shape as another structure for effectively controlling the entire temperature gradients of the reactor, two heat exchangers coupled with, in a two-layer structure, two catalyst parts 16a and 16b each installed on the rear end of the two heat exchangers, respectively, two temperature sensors 17a and 17c each measuring the temperature of the reformed gas coming out through the two catalyst parts 16a and 16b, respectively, and a water discharging part 18 discharging water coming out of the two catalyst parts 16a and 16b.

In the PROX reactor according to the third embodiment which is modified from the second embodiment, each of the second pipe 11b and the third pipe 11c is bent in an elbow shape and is coupled between the two heat exchangers by the coupling 12a. The coupling of the second pipe 11b and the third pipe 11c is parallel with a direction orthogonal to gravity direction, or the direction from the second pipe 11b toward the third pipe 11c can be disposed to be slanted with a predetermined tilt angle in a direction opposite to the gravity direction in order to more easily discharge water.

The PROX reactor integrated with the heat exchangers according to the embodiment measures the temperature of the reformed gas flowed in the reactor and can include a further temperature 17b and a valve 19 for allowing or blocking the inflow of the reformed gas to the reactor according to the temperature of the reformed gas measured, likewise the reactor shown in FIG. 1B.

Also, the PROX reactor integrated with the heat exchanger includes a reaction controller 20 outputting at least one control signals S1 and S2 in order to control the operation of the heat exchanger based on at least one temperature information TO, T1, and T2 detected in the temperature sensor. The reaction controller 20 can be implemented by a logic circuit using a flip-flop or some function parts of a microprocessor usable as a controller of a fuel cell system.

Further, the PROX reactor integrated with the heat exchanger includes a controller 22 capable of controlling the flow of the reformed gas from the reactor to the fuel cell stack or the combustor. The controller 22 can be implemented by a 3-port valve and can be installed to minimize the deactivation of the fuel cell stack by carbon monoxide and by-products generated when performing initial operations and suddenly shutting down the operation.

Figure 5:
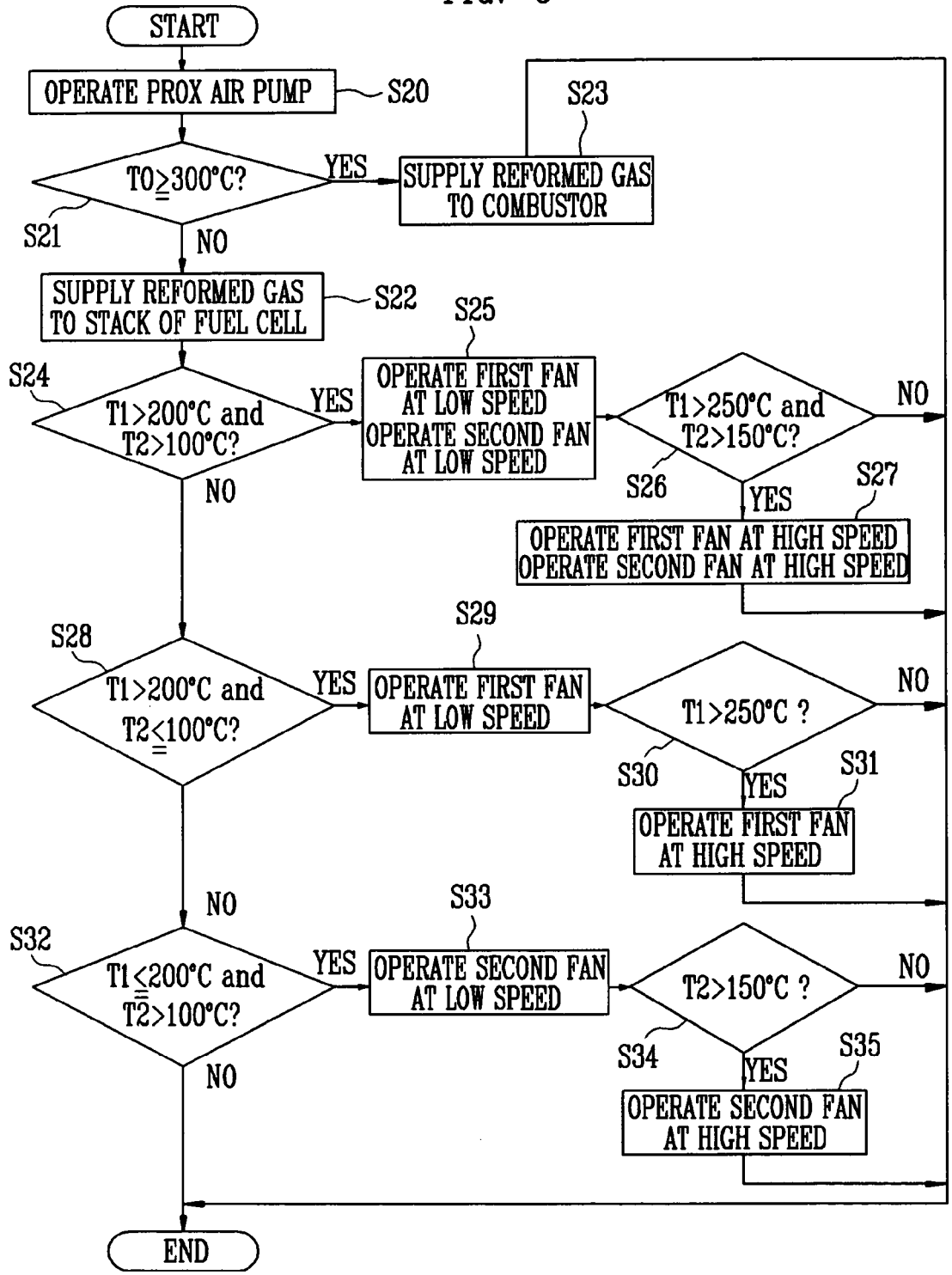
FIG. 5 is a flow chart for an operating method of a PROX reactor integrated with a heat exchanger according a fourth embodiment of the present invention.

FIG. 5 is a flow chart for an operating method of a PROX reactor integrated with a heat exchanger according a fourth embodiment of the present invention.

Referring to FIGS. 4 and 5, in order to operate a PROX reactor integrated with a heat exchanger of the present invention, a reaction controller 20 first operates an air pump 10 for the PROX reactor (S20). Next, it detects the temperature of gas flowed in the reactor and compares the detected temperature TO with a reference temperature, for example, 300° C. (S21). The step S21 is to determine whether it continuously supplies the reformed gas to the PROX reactor or blocks the supply of the reformed gas (or supplies the reformed gas to the combustor) according to the temperature of the reformed gas TO detected in the temperature sensor 17b, when the reformed gas and air are flowed in the reactor by the operation of the air pump for the PROX reactor.

In the step S21, if the temperature of the reformed gas TO is below 300° C., it continuously supplies the reformed gas to the PROX reactor (S22). In the step S21, if the temperature of the reformed gas TO is equal to or exceeds 300° C., it blocks the supply of the reformed gas to the PROX reactor and supplies the reformed gas to the combustor. (S23)

Next, it determines whether the temperature Ti of the reformed gas (hereinafter referred to as "first order reformed gas") coming out through the first catalyst part 16a via the first heat exchanger exceeds a first reference temperature, for example, 200° C. (a first condition) and whether the temperature T2 of the reformed gas (hereinafter referred to as "second order reformed gas") coming out through the second catalyst part 16b via the second heat exchanger from the third pipe 11c exceeds a second reference temperature, for example, 100° C. (a second condition) (S24). In the step S24, if the temperatures T1 and T2 of the first order and the second order reformed gases satisfy the first condition and the second condition, the reaction controller 20 operates the first fan 15a at a low speed (level 1) of the first heat exchanger and operates the second fan (15b) of the heat exchanger at a low speed (level 1) (S25). Then, it determines whether the temperature T1 of the first order reformed gas again detected exceeds a third reference temperature, for example, 250° C. (a third condition) and the temperature T2 of the second order reformed gas again detected exceeds a fourth reference temperature, for example, 150° C. (a fourth condition) (S26). In the step S26, if the temperatures T1 and T2 of the first order and the second order reformed gases satisfy the third condition and the fourth condition, respectively, the reaction controller 20 operates both the first fan 15a and the second fan 15b at a high speed (level 2) in order to more rapidly lower the temperatures of the first order and second order reformed gases (S27).

In addition to the step S24, if the temperature T1 of the first order reformed gas satisfies the first condition but the temperature T2 of the second order reformed gas T2 does not satisfy the second condition (S28), the reaction controller 20 operates the first fan 15a at a low speed in order to lower the temperature Ti of the first order reformed gas (S29). Then, it determines whether the temperature T1 of the first order reformed gas again detected exceeds a third reference temperature (S30), it operates the first fan 15a at a high speed in order to more rapidly lower the temperature of the first order reformed gas (S31).

In addition to the step S24, if the temperature T2 of the second order reformed gas satisfies the second condition but the temperature T1 of the first order reformed gas does not satisfy the first condition (S32), the reaction controller 20 operates the second fan 15b at a low speed in order to lower the temperature T2 of the second order reformed gas (S33). Then, if the temperature of the second order reformed gas again detected exceeds the fourth reference temperature (S34), it operates the second fan 15b at a high speed in order to more rapidly lower the temperature of the second order reformed gas (S35).

Figure 6A:
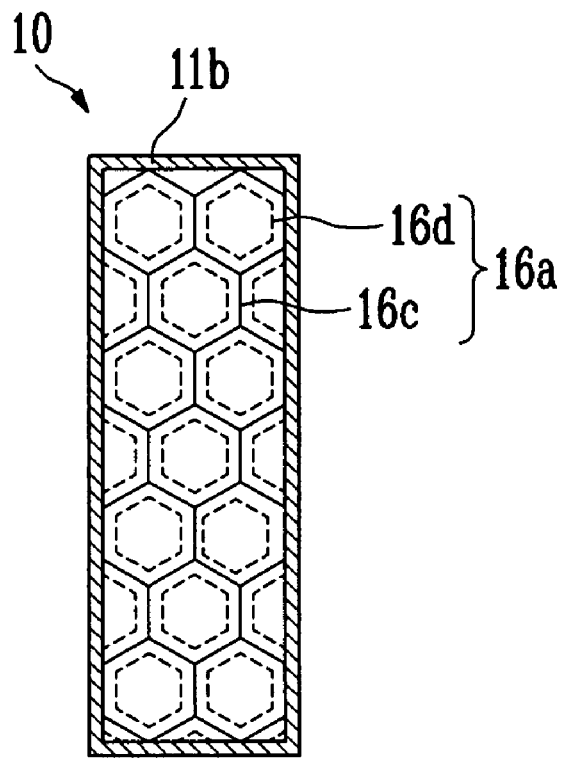
FIGS. 6A and 6B are views for explaining catalysts adoptable in the PROX reactor integrated with the heat exchanger according to the embodiments of the present invention.
Figure 6B:
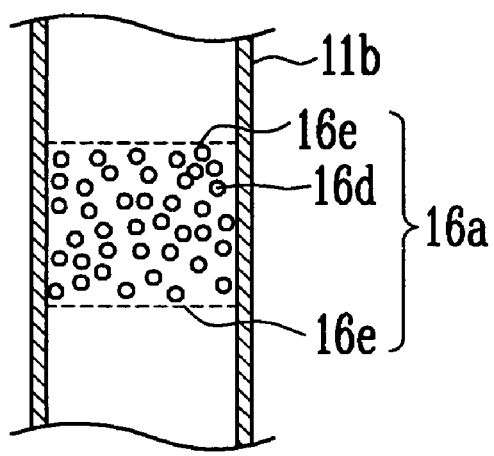

FIGS. 6A and 6B are views for explaining catalysts adoptable in the PROX reactor integrated with the heat exchanger according to the embodiments of the present invention. FIG. 6A shows a longitudinal cross-section of the catalyst installed in the pipe in a direction approximately orthogonal to the gas flow direction and FIG. 6B shows a transverse cross-section of the catalyst installed in the pipe in a direction approximately parallel to the gas flow direction.

The catalyst part 16a of the present invention can be configured of a supporting body 16c in a honeycomb shape inserted into the second pipe 11b and a PROX catalyst 16d coated on the supporting body 16c. The PROX catalyst can be manufactured and coated in a slurry type, as shown in FIG. 6A.

On the other hand, the catalyst part 16a of the present invention can be configured of the PROX catalyst 16d in a bead shape filled in the inside of the second pipe 11b and a reticular formation 16e disposed on both sides of the PROX catalyst 16d in order to prevent the scatter of the PROX catalyst 16d in the bead shape, as shown in FIG. 6B.

The PROX catalyst 16d as described above may include noble metal based catalysts such as platinum, ruthenium, and a rhodium, and cocatalysts such as noble metal based catalysts using, as cocatalysts such as cesium (Ce), iron (Fe), and manganese (Mn), etc. which easily supply oxygen to the noble metal catalysts. Also, the catalyst may include catalysts of base metals such as copper (Cu), chromium (Cr), etc. and cocatalysts such as cesium (Ce), iron (Fe), and manganese (Mn), etc. easily supplying oxygen to the base metalsor catalysts using oxide carrier such as alumina, titania ($TiO_2$), etc. The catalyst part 16b may have the same configuration or a different configuration from the catalyst part 16a.

As described above, the present invention applies the PROX catalyst layer to the existing heat exchanger without having a separate PROX catalyst reactor, and uses the existing heat exchanger, making it possible to improve energy density. Also, the present invention detects the temperature of the PROX reactor to control the temperature with the fan, making it possible to provide a high efficiency of a PROX system that is less sensitive to external environments and is effective the removal of CO. Further, the present invention detects the temperature of the reformed gas at the end or the rear end of the catalyst part and controls the temperature of the reformed gas with the two fans, making it possible to effectively control the reaction temperature.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A preferential oxidation reactor, comprising:
  a pipe having an inlet and an outlet;
  a heat exchanger integrated with the pipe, the heat exchanger cooling gas that passes through the pipe;
  a catalyst part positioned in the pipe at the rear end of the heat exchanger, the catalyst part catalyzing a reaction of the gas;
  a temperature sensor measuring the temperature of the gas coming out through the catalyst part; and
  a reaction controller controlling the operation of the preferential oxidation reactor by operating the heat exchanger to cool the gas when the temperature detected in said temperature sensor is below a predetermined temperature, and blocking the gas flowing into the pipe when the temperature detected in said temperature sensor is not below the predetermined temperature.

2. The preferential oxidation reactor as claimed in claim 1, wherein the pipe includes a first pipe having the inlet and a second pipe having the outlet;
  the heat exchanger is positioned between the first pipe and the second pipe;
  the catalyst part is positioned in the second pipe; and
  the temperature sensor comprises a first temperature sensor coupled with the second pipe.

3. The preferential oxidation reactor as claimed in claim 2, wherein the heat exchanger comprises:
  a plurality of sub-pipes connecting the first pipe and the second pipe;
  a heat transfer plate positioned between the plurality of sub-pipes and having a thin and crimped shape; and
  a fan blowing air to the heat transfer plate.

4. The preferential oxidation reactor as claimed in claim 2, further comprising another temperature sensor measuring the temperature of the gas flowing into the first pipe before a catalyst reaction of the gas.

5. The preferential oxidation reactor as claimed in claim 4, wherein the reaction controller controls the operation of the preferential oxidation reactor by first-operating the heat exchanger at a first cooling rate when the temperature detected in said another temperature sensor is below a predetermined temperature, blocking the gas flowing into the first pipe when the temperature detected in said another temperature sensor is not below the predetermined temperature, second-operating the heat exchanger at a second cooling rate which is higher than the first cooling rate after the first-operating, when the temperature detected in the first temperature sensor is not below a first reference temperature, for a predetermined time or until the temperature detected in the first temperature sensor is below the first reference temperature, whichever is earlier, and blocking the gas flowing into the first pipe when the temperature detected in the first temperature sensor is not below the first reference temperature after the predetermined time.

6. The preferential oxidation reactor as claimed in claim 1, wherein
  the heat exchanger comprises a first heat exchanger and a second heat exchanger; and
  the pipe comprises a first pipe having the inlet, a second pipe connected to the first heat exchanger for receiving the gas from the first heat exchanger, a third pipe connecting the second pipe and the second heat exchanger, and a fourth pipe for receiving the gas from the second heat exchanger and discharging the gas through the outlet.

7. The preferential oxidation reactor as claimed in claim 6, wherein the first heat exchanger comprises a plurality of sub-pipes connecting the first pipe and the second pipe, a heat transfer plate positioned between the plurality of sub-pipes and having a thin and crimped shape, and a fan blowing air to the heat transfer plate; and
  the second heat exchanger comprises a plurality of sub-pipes connecting the third pipe and the fourth pipe, a heat transfer plate positioned between the plurality of sub-pipes of the second heat exchanger and having a thin and crimped shape, and a fan blowing air to the heat transfer plate of the second heat exchanger.

8. The preferential oxidation reactor as claimed in claim 7, wherein the sub-pipes of the first heat exchanger and the sub-pipes of the second heat exchanger are substantially perpendicular to the first, second, third and fourth pipes to make the first and second heat exchangers arranged in a two-layer structure.

9. The preferential oxidation reactor as claimed in claim 8, wherein the first to fourth pipes and the first and second heat exchangers are arranged and/or bent to form an S-letter shape or a reversed S-letter shape, and the position of the inlet is lower than the position of the outlet in the gravity direction.

10. The PROX reactor as claimed in claim 6, wherein the catalyst part comprises a first catalyst part positioned in the pipe between the first heat exchanger and the second heat exchanger and a second catalyst part positioned in the fourth pipe.

11. The preferential oxidation reactor as claimed in claim 10, wherein the temperature sensor comprises a first temperature sensor measuring the temperature of the gas coming out through the first catalyst part and a second temperature sensor measuring the temperature of the gas coming out through second catalyst part.

12. The preferential oxidation reactor as claimed in claim 11, further comprising another temperature sensor measuring the temperature of the gas flowing into the first pipe before a catalyst reaction of the gas.

13. The preferential oxidation reactor as claimed in claim 12, wherein the reaction controller controls the operation of the preferential oxidation reactor by blocking the gas flowing into the first pipe when the temperature detected in said another temperature sensor exceeds a predetermined temperature, first-operating (i) the first heat exchanger at a first cooling rate and the second heat exchanger at a first cooling rate when the temperature detected in the first temperature sensor is over a first reference temperature and the temperature detected in the second temperature sensor is over a second reference temperature, (ii) the first heat exchanger at the first cooling rate when the temperature detected in the first temperature sensor is over the first reference temperature and the temperature detected in the second temperature sensor is not over the second reference temperature, or (iii) the second heat exchanger at the first cooling rate when the temperature detected in the first temperature sensor is not over the first reference temperature and the temperature detected in the second temperature sensor is over the second reference temperature, second-operating (a) the first heat exchanger at a second cooling rate which is higher than the first cooling rate of the first heat exchanger and the second heat exchanger at a second cooling rate which is higher than the first cooling rate of the first heat exchanger after the first-operating when the temperature detected in the first temperature sensor is over a third reference temperature and the temperature detected in the second temperature sensor is over a fourth reference temperature, (b) the first heat exchanger at the second cooling rate after the first-operating when the temperature detected in the first temperature sensor is over the third reference temperature, or (c) the second heat exchanger at the second cooling rate after the first-operating when the temperature detected in the second temperature sensor is over the second reference temperature.

14. The preferential oxidation reactor as claimed in claim 1, wherein the catalyst part includes catalysts selected from the group consisting of platinum, ruthenium, a rhodium, copper and chromium, and cocatalysts of at least one selected from the group consisting of cerium, iron, and manganese.

15. The preferential oxidation reactor as claimed in claim 1, wherein the catalyst part comprises a supporting body in a honeycomb shape and a catalyst immobilized on the supporting body.

16. The preferential oxidation reactor as claimed in claim 1, wherein the catalyst part comprises a catalyst in a bead shape and a reticular formation arranged at the ends of the catalyst to prevent the catalyst from being scattered.

17. A method of removing carbon monoxide contained in reformed gas, comprising utilizing the preferential oxidation reactor of claim 1.

18. A preferential oxidation reactor, comprising:
a first pipe having an inlet for receiving gas;
a heat exchanger comprising:
a plurality of sub-pipes connected to the first pipe;
a heat transfer plate positioned between the plurality of sub-pipes and having a thin and crimped shape; and
a fan blowing air to the heat transfer plate;
a second pipe connected to the plurality of sub-pipes and having an outlet;
a catalyst part positioned in the second pipe, the catalyst part catalyzing a reaction of carbon monoxide contained in the gas;
a first temperature sensor measuring the temperature of the gas coming out through the catalyst part; and
a reaction controller controlling the operation of the preferential oxidation reactor by operating the heat exchanger to cool the gas when the temperature detected in the first temperature sensor is below a predetermined temperature, and blocking the gas flowing into the pipe when the temperature detected in the first temperature sensor is not below the predetermined temperature.

19. A preferential oxidation reactor, comprising:
a first pipe having an inlet for receiving gas;
a first heat exchanger comprising:
a plurality of first sub-pipes connected to the first pipe;
a first heat transfer plate positioned between the plurality of first sub-pipes and having a thin and crimped shape; and
a first fan blowing air to the first heat transfer plate;
a second pipe connected to the plurality of first sub-pipes;
a first catalyst part positioned in the second pipe;
a second heat exchanger comprising:
a plurality of second sub-pipes connected to the second pipe;
a second heat transfer plate positioned between the plurality of second sub-pipes and having a thin and crimped shape; and
a second fan blowing air to the second heat transfer plate;
a third pipe connected to the plurality of second sub-pipes;
a second catalyst part positioned in the third pipe; and
a reaction controller controlling the operation of the preferential oxidation reactor by first-operating the first heat exchanger at a first cooling rate and the second heat exchanger at a first cooling rate when the temperature detected in the first temperature sensor is over a first reference temperature and the temperature detected in the second temperature sensor is over a second reference temperature, (ii) the first heat exchanger at the first cooling rate when the temperature detected in the first temperature sensor is over the first reference temperature and the temperature detected in the second temperature sensor is not over the second reference temperature, or (iii) the second heat exchanger at the first cooling rate when the temperature detected in the first temperature sensor is not over the first reference temperature and the temperature detected in the second temperature sensor is over the second reference temperature, second-operating (a) the first heat exchanger at a second cooling rate which is higher than the first cooling rate of the first heat exchanger and the second heat exchanger at a second cooling rate which is higher than the first cooling rate of the first heat exchanger after the first-operating when the temperature detected in the first temperature sensor is over a third reference temperature and the temperature detected in the second temperature sensor is over a fourth reference temperature, (b) the first heat exchanger at the second cooling rate after the first-operating when the temperature detected in the first temperature sensor is over the third reference temperature, or (c) the second heat exchanger at the second cooling rate after the first-operating when the temperature detected in the second temperature sensor is over the second reference temperature.

20. A method of removing carbon monoxide contained in reformed gas, comprising utilizing the preferential oxidation reactor of claim 19.

* * * * *